(12) United States Patent
Weitz et al.

(10) Patent No.: US 12,526,242 B2
(45) Date of Patent: Jan. 13, 2026

(54) TRAFFIC MANAGEMENT IN A NETWORK DEVICE

(71) Applicant: Avago Technologies International Sales Pte. Limited, Singapore (SG)

(72) Inventors: Eliezer Weitz, Holon (IL); Alexander Goldstein, Netanya (IL); Asaf Koren, Netanya (IL); Yariv Aviram, Pardes Hanna-Karkur (IL); Jacob Harel, Hod HaSharon (IL); Bela Federmesser, Bat Yam (IL); Benoit Marcel Simon Christiaens, Berchem-Sainte-Agathe (BE); Raphael Paul Claude André Cassiers, Waterloo (BE); Noam Sheffer, Ra'anana (IL)

(73) Assignee: Avago Technologies International Sales Pte. Limited, Singapore (SG)

( * ) Notice: Subject to any disclaimer, the term of this patent is extended or adjusted under 35 U.S.C. 154(b) by 68 days.

(21) Appl. No.: 18/666,568

(22) Filed: May 16, 2024

(65) Prior Publication Data

US 2025/0358236 A1 Nov. 20, 2025

(51) Int. Cl.
*G06F 15/16* (2006.01)
*H04L 47/56* (2022.01)
*H04L 47/62* (2022.01)

(52) U.S. Cl.
CPC .......... *H04L 47/621* (2013.01); *H04L 47/562* (2013.01); *H04L 47/6225* (2013.01)

(58) Field of Classification Search
CPC .. H04L 47/562; H04L 47/621; H04L 47/6225

USPC .......................................................... 709/224
See application file for complete search history.

(56) References Cited

U.S. PATENT DOCUMENTS

| | | | |
|---|---|---|---|
| 7,418,523 B2* | 8/2008 | Pettyjohn | H04L 47/564 370/235 |
| 8,230,110 B2 | 7/2012 | Vegesna et al. | |
| 8,848,723 B2 | 9/2014 | Sundararaman et al. | |
| 8,943,236 B1* | 1/2015 | Usmani | H04L 12/6418 710/21 |
| 9,083,649 B2* | 7/2015 | Finkelstein | H04L 47/52 |
| 9,225,659 B2* | 12/2015 | McCanne | H04L 47/6215 |
| 9,461,930 B2* | 10/2016 | Pollock | H04L 49/506 |
| 10,104,003 B1* | 10/2018 | Savir | H04L 47/365 |

(Continued)

OTHER PUBLICATIONS

Extended European Search Report mailed Jun. 13, 2025 in European Patent Application No. 25176650.7, 11 pages.

*Primary Examiner* — Moustafa M Meky
(74) *Attorney, Agent, or Firm* — Kim & Stewart LLP

(57) ABSTRACT

An example traffic management system for a network device includes: a first memory storing queues of packets received by the network device; a second memory storing data of a scheduler for the queues that schedules transmission of the packets to a port of the network device; and an accelerator circuit including a third memory to store a data structure, the accelerator circuit coupled to the second memory and operable to: load, for a first iteration of a traverse operation in response to a command, a field of the data structure in the third memory with data from a first node of the scheduler; update, during the first iteration of the traverse operation, the field of the data structure in the third memory; and store, during the first iteration of the traverse operation, updated data from the field to the first node in the second memory.

20 Claims, 10 Drawing Sheets

(56) References Cited

U.S. PATENT DOCUMENTS

| | | | |
|---|---|---|---|
| 10,171,369 B2* | 1/2019 | Callard | H04L 47/6295 |
| 11,528,347 B2* | 12/2022 | Uscumlic | G06N 3/006 |
| 11,750,504 B2* | 9/2023 | Hewson | H04L 49/3027 |
| | | | 370/413 |
| 11,902,150 B2* | 2/2024 | Roweth | H04L 45/566 |
| 12,021,757 B2* | 6/2024 | Lee | H04L 47/6225 |
| 12,040,969 B2* | 7/2024 | Beecroft | H04L 47/12 |
| 12,360,923 B2* | 7/2025 | Hewson | H04L 45/70 |
| 2003/0046414 A1* | 3/2003 | Pettyjohn | H04L 49/3081 |
| | | | 709/250 |
| 2008/0056130 A1* | 3/2008 | Desai | H04L 47/2441 |
| | | | 370/231 |
| 2008/0056278 A1* | 3/2008 | Kadambi | H04L 12/5602 |
| | | | 370/395.53 |
| 2013/0089099 A1* | 4/2013 | Pollock | H04L 49/506 |
| | | | 370/412 |
| 2014/0003238 A1* | 1/2014 | Finkelstein | H04L 47/52 |
| | | | 370/417 |
| 2021/0409521 A1* | 12/2021 | Platenius-Mohr | G06N 5/022 |
| 2022/0086100 A1* | 3/2022 | Biederman | H04L 47/56 |
| 2023/0300081 A1* | 9/2023 | Lee | H04L 47/25 |
| | | | 370/230.1 |

* cited by examiner

TRAFFIC MANAGEMENT IN A NETWORK DEVICE

BACKGROUND

Network devices, such as switches, routers, bridges, etc., employ traffic management to maintain efficient network performance, ensure fair resource allocation, and provide quality of service (QOS) in a network. Traffic management involves various techniques to control the flow of packets through the network, making decisions on how the packets are handled, prioritized, and routed. Traffic management includes packet classification, queue management, scheduling, congestion management, and rate limiting and traffic shaping techniques. A network switch can classify packets based on defined rules and policies. The packets can be placed into different queues based on their classifications. A network switch can have multiple queues for handling packets of different classifications. Scheduling algorithms decide the order in which the network switch processes and sends the packets from the queues. Common scheduling algorithms include priority queuing, first-in-first-out (FIFO), weighted fair queuing (WFQ), deficit weighted round robin (DWRR), and the like. The scheduling algorithms manage congestion and ensure that high-priority packets receive appropriate bandwidth and minimal delay. Rate limiting controls the rate at which a sender can send packets to ensure that the network does not get overwhelmed. Traffic shaping smooths out packet bursts to ensure a smother packet flow adhering to a specified rate.

Traffic management becomes difficult when serving a high-speed port of a network switch, such as an optical line terminal (OLT) in a passive optical network (PON). Such a network switch can include many queues (e.g., thousands of queues), each of which has many parameters to consider for scheduling, congestion management, rate limiting, and traffic shaping. Further, the scheduler can be hierarchical and include many levels, each having many parameters to consider. For low-bandwidth ports, a traffic management system can be implemented using a central processing unit (CPU) executing software. For high-bandwidth ports, such as those in an OLT (e.g., 10 gigabits per second (Gbps) to 400 Gbps), a CPU executing software alone is insufficient to implement the traffic management system.

SUMMARY

In an embodiment, a traffic management system for a network device is described. The traffic management system includes a first memory storing queues of packets received by the network device. The traffic management system includes a second memory storing data of a scheduler for the queues that schedules transmission of the packets to a port of the network device. The traffic management system includes an accelerator circuit including a third memory to store a data structure. The accelerator circuit is coupled to the second memory and operable to load, for a first iteration of a traverse operation in response to a command, a field of the data structure in the third memory with data from a first node of the scheduler. The accelerator is operable to update, during the first iteration of the traverse operation, the field of the data structure in the third memory. The accelerator is operable to store, during the first iteration of the traverse operation, updated data from the field to the first node in the second memory.

In an embodiment, a network device is described. The network device includes a queue manager operable to maintain queues of packets, a port, a controller coupled to the queue manager and the port, a first memory storing nodes of a scheduler for the queues that schedules transmission of the packets to the port, and an accelerator circuit including a second memory. The accelerator circuit is coupled to the controller and the first memory and operable to load, for a traverse operation in response to a command from the controller, the second memory with data from each of multiple nodes of the nodes successively over multiple iterations. The accelerator is operable to update, during the traverse operation for at least one of the multiple iterations, the second memory. The accelerator is operable to store, during the traverse operation, updated data from the second memory to at least one of the multiple nodes in the first memory.

In an embodiment, a method of traffic management in a network device is described. The method includes storing, in queues, packets received by the network device. The method includes storing, in a first memory, nodes of a scheduler to select for the queues that schedules transmission of the packets to a port of the network device. The method includes updating, by an accelerator circuit in response to a command from a controller, the scheduler by loading, for a traverse operation, fields of a data structure with data from each of multiple nodes of the nodes successively over multiple iterations, updating, during the traverse operation for at least one of the multiple iterations, the fields of the data structure, and storing, during the traverse operation, updated data to at least one of the multiple nodes in the first memory.

DETAILED DESCRIPTION

Figure 1:
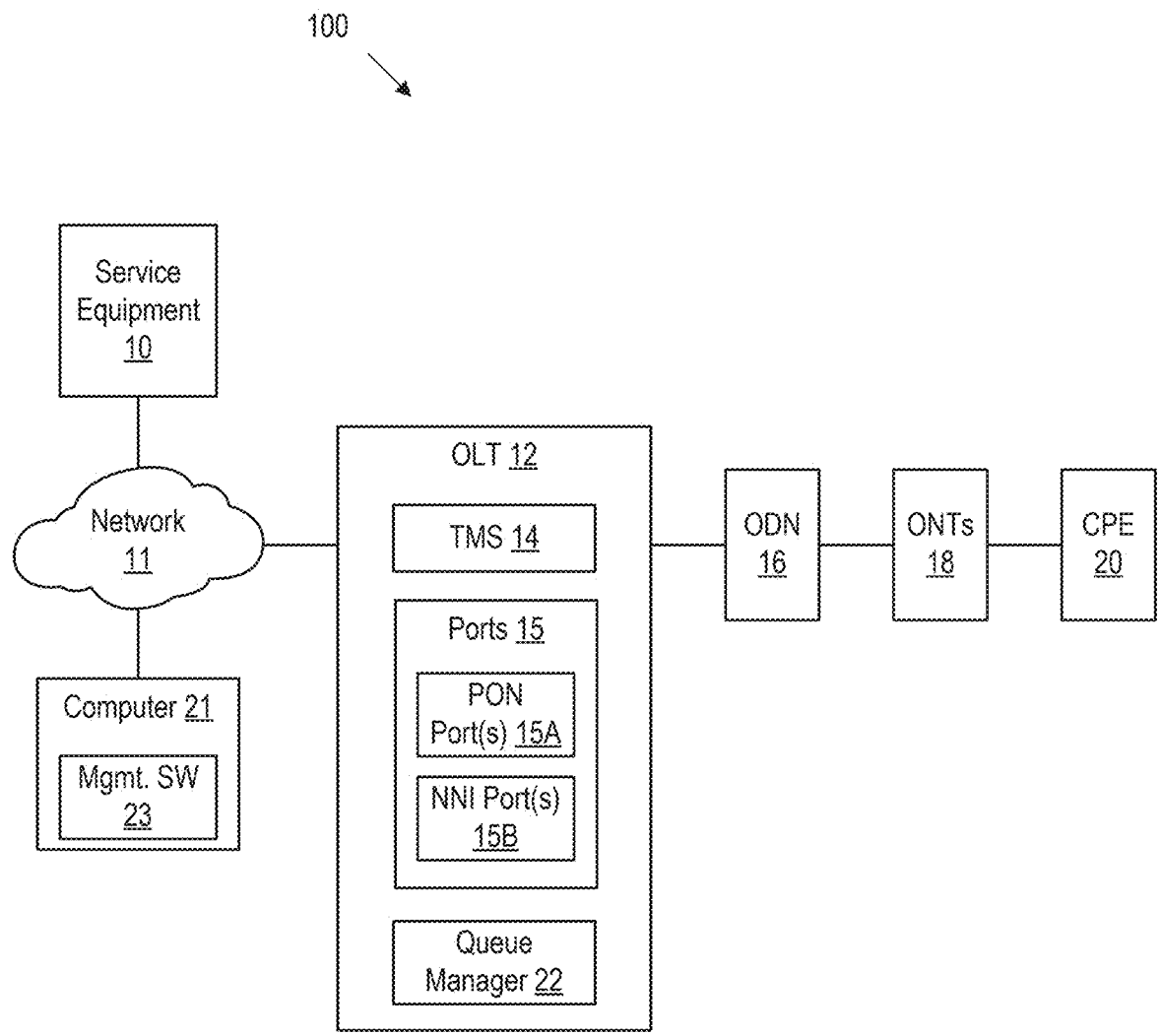
FIG. 1 is a block diagram depicting a communication system according to some embodiments.

FIG. 1 is a block diagram depicting a communication system 100 according to some embodiments. Communication system 100 includes service equipment 10, a network 11, a computer 21, an optical line terminal (OLT) 12, an optical distribution network (ODN) 16, optical network terminals (ONTs) 18, and customer premises equipment (CPE) 20. Network 11 may be an electrical network, such as an Ethernet network or the like. Service equipment 10 and computer 21 are connected to network 11. OLT 12 includes a traffic management system (TMS) 14, ports 15, and a queue manager 22. Ports 15 may send and receive data units, which can be packets, frames, segments, and the like. A packet may be any unit of data (e.g., an Internet Protocol (IP) packet). A packet may be encapsulated within another data unit (e.g., an IP packet encapsulated in an Ethernet frame). A packet may be encapsulated in another data structure, such as a packet descriptor (PD). TMS 14 manages traffic sent by port(s) 15. Traffic may be an amount of data sent or received during any given time. Queue manager 22 can manage queues of packets for transmission.

A port may be a physical entity (e.g., circuit) or virtual entity (e.g., logical entity implemented using software executing on a processor) that provides an input/output (IO) interface of a network device. Ports 15 can include one or more passive optical network (PON) ports 15A and one or more network-to-network interface (NNI) ports 15B. OLT 12 is connected to network 11 via NNI port(s) 15B (e.g., Ethernet port(s)). Each NNI port 15B sends packets to, and receives packets from, network 11 using electrical signals. OLT 12 is connected to ODN 16 via PON port(s) 15A. Each PON port 15A sends packets to, and receives packets from, ODN 16 using optical signals.

ODN 16 comprises an optical transmission medium (e.g., optical fiber) that connects OLT 12 to ONU/ONTs 18. In some embodiments, communication system 100 implements a PON. A PON is "passive" in that, aside from OLT 12 and ONTs 18, ODN 16 uses passive components and does not require any power for signal transmission. ONTs 18 (also referred to as optical network units (ONUs)) convert optical signals transmitted by OLT 12 and received from ODN 16 into electrical signals. CPE 20 comprises network devices, such as switches, routers, etc., which process the packets received via electrical signals from ONTs 18. Computer 21 executes management software 23, which may control aspects of OLT 12 as described further herein.

Service equipment 10, network 11, computer 21, and OLT 12 can be located in a central office (CO). CPE 20 can be distributed across many locations (e.g., houses, businesses, etc.) and includes network devices of many customers. Service equipment 10 can send packets to the customers concurrently. TMS 14 can maintain many queues for packets, such as one or more queues for each of the customers serviced by service equipment 10. A queue may store a set of packets retrievable in a definite order (e.g., order of insertion). A PON port 15A can be a high-speed port, sending packets to many customers over ODN 16 (e.g., on the order of Gbps, such as between 10 Gbps and 400 Gbps). TMS 14 employs hardware acceleration to implement traffic management for a PON port 15A. Hardware acceleration involves a controller executing software and offloading some tasks to specific hardware circuits. The hardware acceleration implemented by TMS 14 is described below.

Communication system 100 is just one example system in which TMS 14 may be deployed for traffic management. While TMS 14 is shown in an OLT 12, TMS 14 may be implemented in any type of network device. While TMS 14 is described as performing traffic management for a PON port 15A, TMS 14 may perform traffic management for any type of network port (e.g., Ethernet ports). While TMS 14 is described within the context of a PON, TMS 14 may be implemented in a network device in a different type of network (e.g., an electrical network or different type of optical network). In general, TMS 14 provides traffic management for a port of a network device. In some embodiments, TMS 14 provides traffic management for a high-speed port, which can send out data at rates between 10 Gbps and 400 Gbps. However, TMS 14 can provide traffic management of other-speed ports, such as those having data rates less than 10 Gbps or more than 400 Gbps.

Figure 2:
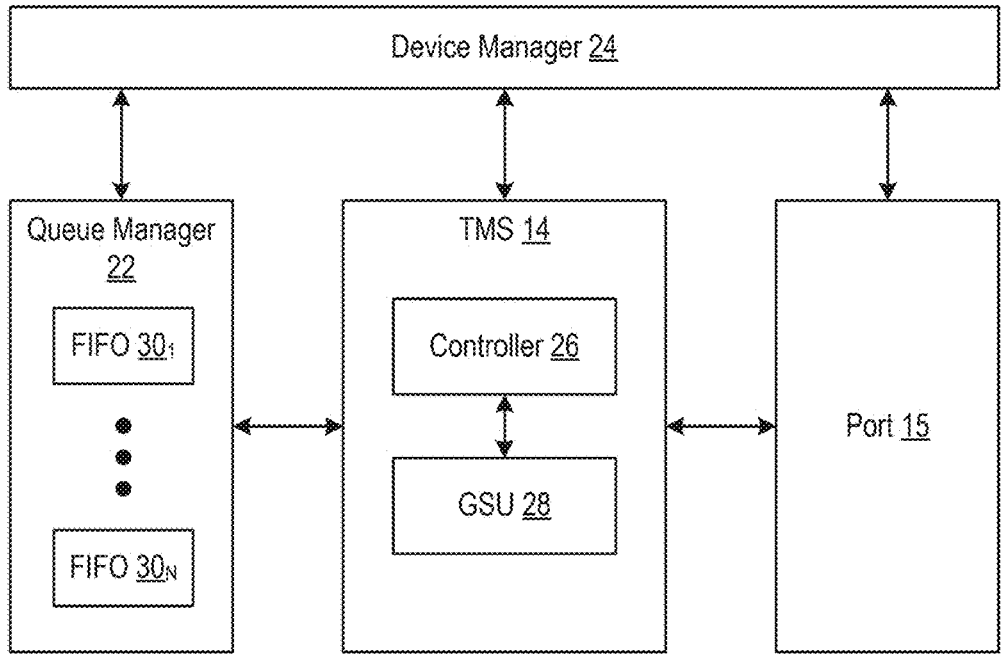
FIG. 2 is a block diagram depicting a channel of network device according to some embodiments.

FIG. 2 is a block diagram depicting a channel of OLT 12 according to some embodiments. The channel of OLT 12 includes a queue manager 22, TMS 14, and port 15. OLT 12 may include a device manager 24 coupled to each of queue manager 22, TMS 14, and port 15. Queue manager 22 is coupled to TMS 14. TMS 14 is coupled to port 15. Queue manager 22 receives input packets and generates packet descriptors (PDs). A PD may be a data structure that includes packet(s) and associated metadata. The metadata of a PD can be attributes of the packet(s), such as packet length, source/destination addresses, priority information, quality of service (QOS) information, timestamps, error checking information, and the like. Queue manager 22 includes a set of first-in-first-out memories (FIFOs) $30_1, 30_2, \ldots, 30_N$ (where N is an integer greater than one). Queue manager 22 inserts PDs into queues implemented by FIFOs $30_1 \ldots 30_N$ based attribute(s) in the metadata.

For example, service equipment 10 can generate packets for multiple customers each having a unique IP address. Each of FIFOs $30_1 \ldots 30_N$ of queue manager 22 can be associated with a destination IP address or other identifier of a customer. Queue manager 22 can insert PDs into FIFOs $30_1 \ldots 30_N$ based on destination IP or other customer identifier. In general, FIFOs $30_1 \ldots 30_N$ can be associated with any attribute(s) of PD metadata and PDs can be inserted into the queues based on such attribute(s). Device manager 24 can send commands to queue manager 22 to add or remove queues. A command may be any data associated with an operation to be performed. Thus, the number N of FIFOs $30_1 \ldots 30_N$ can change over time as queues are added or removed (e.g., a new customer is added or an existing customer is removed).

TMS 14 includes a controller 26 and a general scheduling unit (GSU) 28. Controller 26 executes software to orchestrate scheduling PDs for transmission by port 15. Device manager 24 configures GSU 28 with a scheduler. A scheduler for a set of queues may be logic that schedules packets for transmission from the queues in a sequence. The scheduler may be hierarchical comprising multiple scheduler nodes (examples described below). A node of a scheduler (also referred to as a scheduler node) may itself be a scheduler that selects an output from a set of inputs. The inputs of the leaf nodes of the scheduler are the queues. An output of a root node of the scheduler supplies a currently selected queue. A root node is a last node in the hierarchy of the scheduler. Queue manager 22 can send notifications to controller 26 when updating queues with PDs and, in response, controller 26 can send commands to GSU 28 to update the scheduler. A notification may be any data indicating or requesting an action. Port 15 can send notifications to controller 26 to request PD(s) to transmit and, in response, controller 26 can send commands to GSU 28 for the PD(s) to transmit and to update the scheduler. Controller 26 outputs PD(s) to port 15 for transmission.

Management software 23 executing on computer 21 can interact with device manager 24 to control aspects of queue manager 22, port 15, and TMS 14. For example, management software 23 can interact with device manager 24 to add or remove queues managed by queue manager 22. Management software 23 can interact with device manager 24 to configure a scheduler in GSU 28. Management software 23 can interact with device manager 24 to update software of controller 26. Management software 23 can interact with device manager 24 to set parameters of port 15 (e.g., transmission rate). Device manager 24 can comprise, for example, a CPU executing software that provides an application programming interface (API), graphical user interface (GUI), or the like for controlling aspects of OLT 12.

FIG. 2 shows one channel of OLT 12 by way of example. In some embodiments, TMS 14 can service multiple ports 15. In some embodiments, OLT 12 can include multiple instances of TMS 14 for multiple ports 15. In some embodiments, queue manager 22 can service multiple instances of TMS 14. In some embodiments, OLT 12 can include multiple instances of queue manager 22, each servicing one of multiple instances of TMS 14. While OLT 12 is described by way of example, the structure shown in FIG. 2 can be implemented in any type of network device, including any type of router, network switch, or the like.

Figure 3:
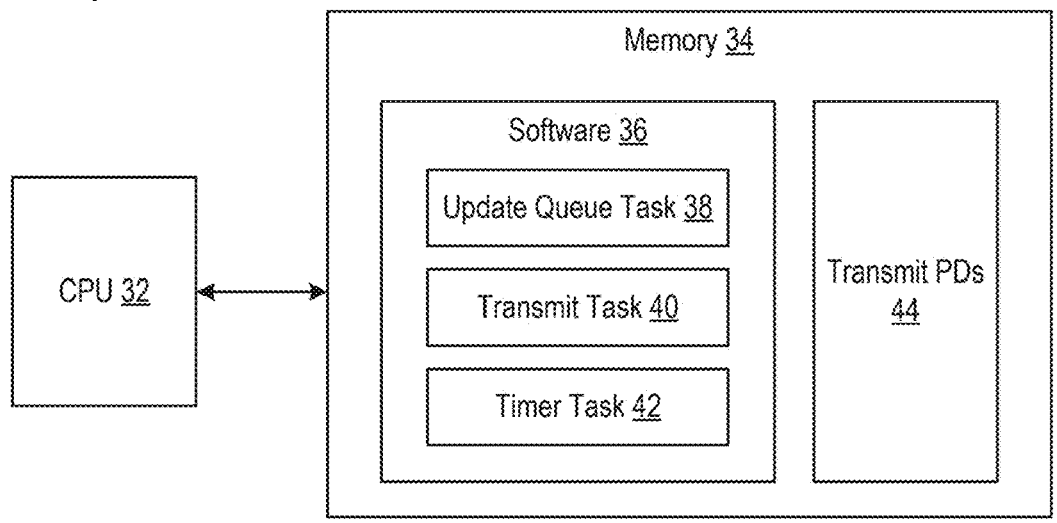
FIG. 3 is a block diagram depicting a controller of a traffic management system according to some embodiments.

FIG. 3 is a block diagram depicting controller 26 of TMS 14 according to some embodiments. Controller includes CPU 32 coupled to a memory 34. Memory 34 may be random access memory (RAM). Memory 34 stores software 36 and transmit PDs 44. Software 36 includes an update queue task 38, a transmit task 40, and a timer task 42. Queue manager 22 wakes up update queue task 38 to notify controller 26 of queue update(s). In response, update queue task 38 sends a command to GSU 28 to update the scheduler based on the queue update(s). Port 15 wakes up transmit task 40 to notify controller 26 of a request to transmit PD(s). In response, transmit task 40 sends a command to GSU 28 to obtain PD(s) to transmit from selected queue(s) and perform update(s) to the scheduler. GSU 28 stores transmit PDs 44 in memory 34. Transmit task 40 can then send transmit PDs 44 to port 15 for transmission of packets. Timer task 42 can periodically send a command to GSU 28 to update the scheduler (e.g., for periodic updates to scheduler parameters). In embodiments, memory 34 includes firmware (e.g., nonvolatile memory) that stores software 36, which CPU 32 can load into volatile memory (e.g., RAM) for execution.

Figure 4:
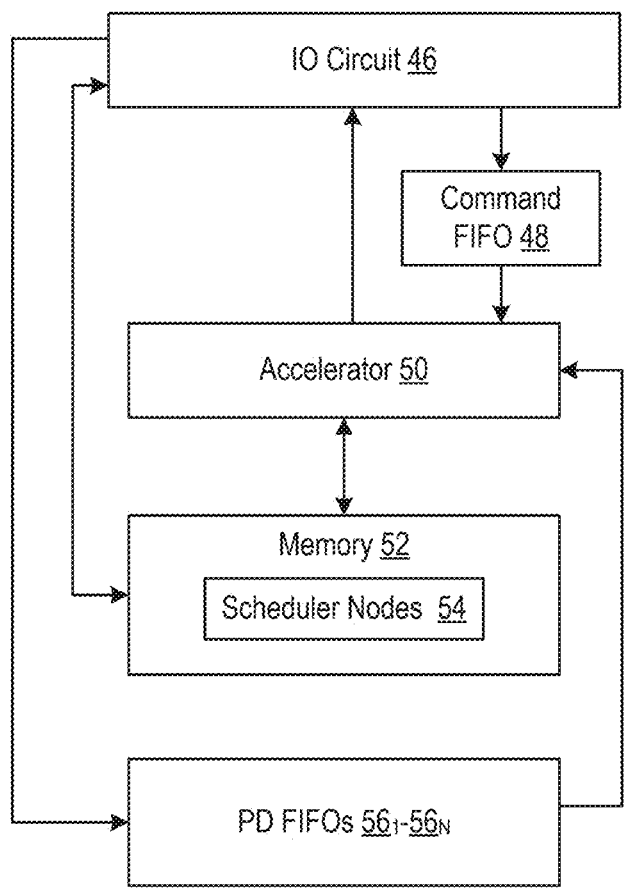
FIG. 4 is a block diagram depicting a generic scheduling unit according to some embodiments.

FIG. 4 is a block diagram depicting GSU 28 according to some embodiments. GSU 28 comprises an input/output (IO) circuit 46, a command FIFO 48, an accelerator 50 (also referred to as an accelerator circuit), a memory 52, and PD FIFOs $56_1 \ldots 56_N$. IO circuit 46 provides an interface of GSU 28 to queue manager 22, controller 26, and device manager 24. Queue manager 22 is coupled to IO circuit 46 to store PDs in PD FIFOs $56_1 \ldots 56_N$. PD FIFOs $56_1 \ldots 56_N$ corresponding to FIFOs $30_1 \ldots 30_N$. FIFOs $30_1 \ldots 30_N$ and PD FIFOs $56_1 \ldots 56_N$ combine to implement N queues managed by queue manager 22. FIFOs $30_1 \ldots 30_N$ each store PDs at the tail of a respective queue. PD FIFOs $56_1 \ldots 56_N$ each store PDs at the head of a respective queue. Memory 52 can be RAM and stores scheduler nodes 54. Scheduler nodes 54 comprise nodes of the scheduler implemented by GSU 28. Each scheduler node 54 comprises data, as described further below. Device manager 24 is coupled to IO circuit 46 to store scheduler nodes 54 in memory 52 when initializing GSU 28 with a scheduler. Controller 26 is coupled to IO circuit 46 to store commands in command FIFO 48.

Accelerator 50 (or accelerator circuit) may be a circuit operable to perform processing, using digital logic, on behalf of controller 26. Accelerator 50 is coupled to command FIFO 48, memory 52, and PD FIFOs $56_1 \ldots 56_N$. Accelerator 50 can receive commands sent by controller 26 from command FIFO 48. Accelerator 50 can read scheduler nodes 54 from memory 52 when traversing the hierarchy of the scheduler to perform an update of the scheduler and to determine the current selected queue. Accelerator 50 can read PDs from PD FIFOs $56_1 \ldots 56_N$. Accelerator 50 is coupled to IO circuit 46 to output PDs to controller 26.

Figure 5:
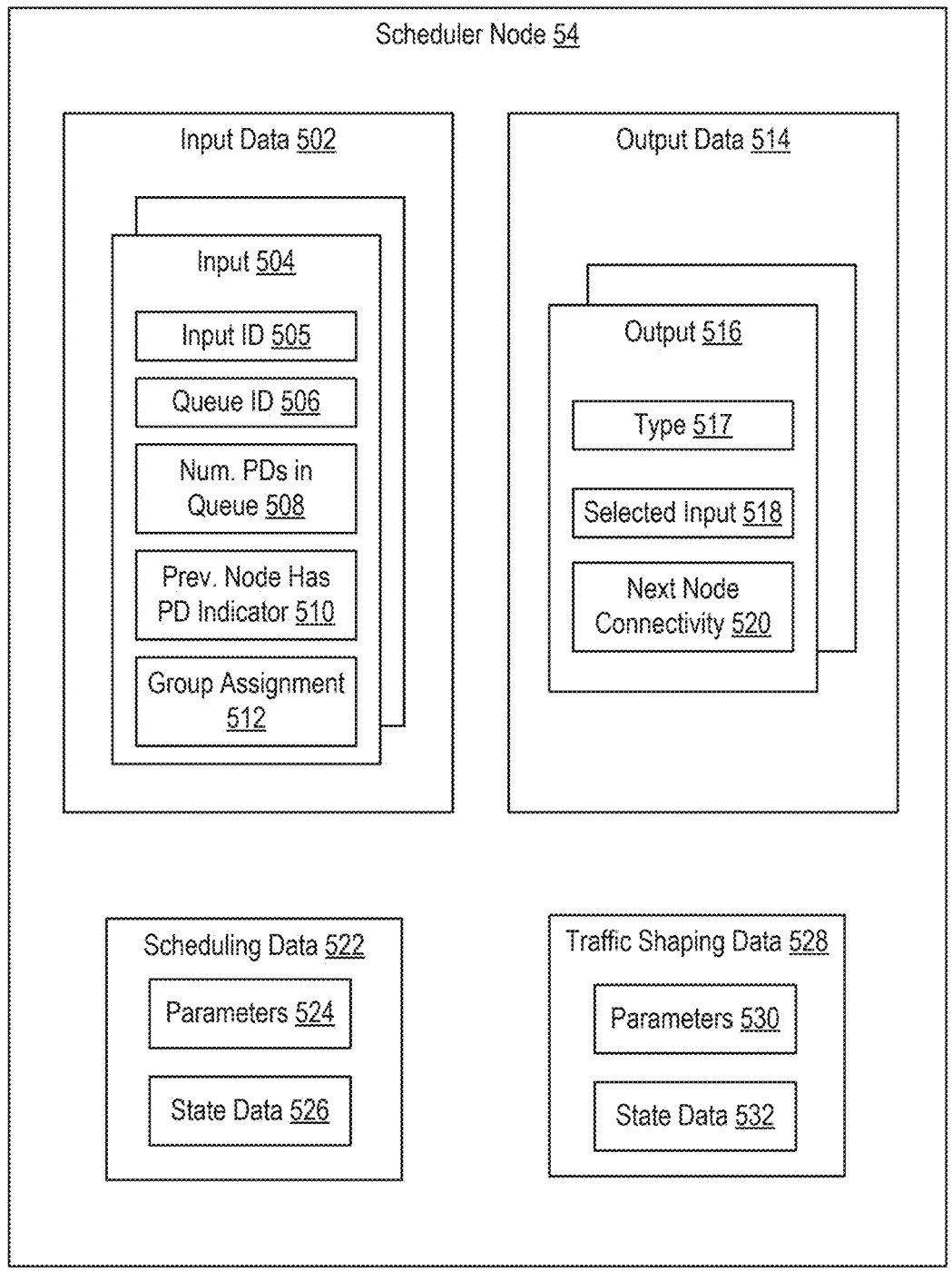
FIG. 5 is a block diagram depicting a scheduler node according to some embodiments.

FIG. 5 is a block diagram depicting a scheduler node 54 according to some embodiments. Scheduler node 54 includes input data 502, output data 514, scheduling data 522, and traffic shaping data 528. Input data 502 includes data for one or more inputs 504 of scheduler node 54. An input 504 can include an input ID 505 storing an identifier for the input. For each input 504 coming from a queue, queue ID 506 stores an identifier of the queue being served and number of PDs in queue 508 stores the number of PDs in the queue being served. For each input coming from a previous scheduler node in the hierarchy, input 504 can include an indication of whether the previous scheduler node has a PD to transmit (stored by indicator 510).

Output data 514 includes data for one or more outputs 516 of scheduler node 54. Each output 516 includes a type 517, such as a committed information rate (CIR) output or an excessive information rate (EIR) output. In some embodiment, GSU 28 implements traffic shaping to ensure each queue receives a determined amount of bandwidth. CIR is a minimum bandwidth guaranteed to a queue. EIR is an excessive bandwidth that may be allowed for a queue, but with potential restrictions. A queue having traffic within CIR can be selected for output 516 having type CIR. A queue having traffic within EIR can be selected for output 516 having type EIR. Each output 516 includes a selected input 518, which can be an identifier of a selected one of inputs 504. Each output 516 can include next node connectivity 520, which can store an identifier of a next scheduler node 54 in the hierarchy of the scheduler.

GSU 28 implements a scheduling algorithm in digital logic, as discussed further below. The scheduling algorithm can be any known scheduling algorithm or combination of such known scheduling algorithms. In some embodiments, GSU 28 implements a combination of strict priority scheduling and DWRR scheduling. Strict priority scheduling is selection of a queue based on a priority, referred to as a strict priority. DWRR scheduling is designed to handle different traffic flows with varying QoS requirements. In DWRR, each queue is assigned a weight in addition to a deficit counter. The weight reflects the relative importance or priority of the queue. DWRR uses a deficit counter for each queue to track the amount of data that the queue is allowed to send. The increment to the deficit counter at the beginning of each round is proportional to the queue's weight. While strict priority and DWRR are described as example scheduling algorithms, it is to be understood that scheduler node 54 can implement different types of scheduling algorithms in various combinations.

Each input 504 can include a group assignment 512. For example, input groups can be divided between strict priority group(s) and DWRR priority group(s) (e.g., high strict priority, high priority DWRR, low strict priority, low priority DWRR, etc.). Scheduling data 522 includes parameters 524 and state data 526 used by the scheduling algorithm implemented by GSU 28. Parameters 524 can include, for example, increment values of DWRR counters, DWRR weights for inputs, and the like. State data 526 can include, for example, current values of DWRR counters, current input selections for DWRR groups, and the like. Traffic shaping data 528 includes parameters 530 and state data 532 used by the traffic shaping algorithm implemented by GSU 28. Parameters 530 can include, for example, maximum values and increment values of CIR/EIR output shapers. State data 532 can include, for example, current values of CIR/EIR output shapers.

Scheduler node 54 can be used for different types of nodes of the scheduler, e.g., leaf nodes having queues as input, intermediate nodes, or the root node. Some data of scheduler node 54 may be valid for a given type of node, while other data may be invalid for that type (e.g., set to null). While specific types of data are shown in the example of FIG. 5, those skilled in the art will appreciate that scheduler node 54 can include other types of data associated with the inputs/outputs and used for scheduling and traffic shaping.

Figure 6:
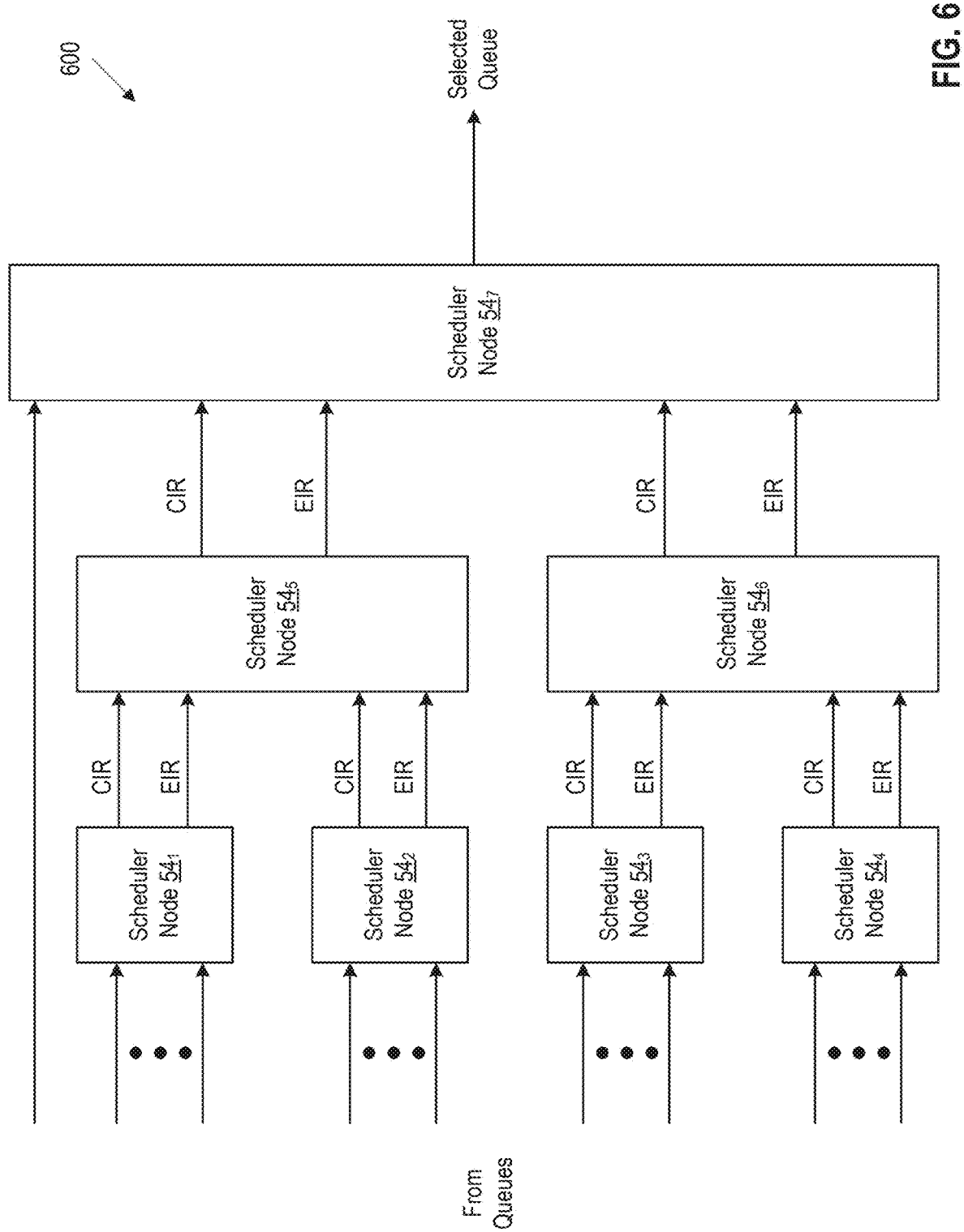
FIG. 6 is a block diagram depicting a scheduler according to some embodiments.

FIG. 6 is a block diagram depicting a scheduler 600 according to some embodiments. Scheduler 600 comprises a hierarchy of scheduler nodes 54. Scheduler nodes $54_1 \ldots 54_4$ comprise leaf nodes of scheduler. Inputs to scheduler nodes $54_1 \ldots 54_4$ comprise outputs of the queues. Each scheduler node $54_1 \ldots 54_4$ has two outputs of types CIR and EIR. CIR/EIR outputs from scheduler nodes $54_1$ and $54_2$ are coupled to inputs of scheduler node $54_5$, which is an intermediate node. CIR/EIR outputs from scheduler nodes $54_3$ and $54_4$ are coupled to inputs of scheduler node $54_6$, which is another intermediate node. CIR/EIR outputs of scheduler nodes $54_5$ and $54_6$ are coupled to inputs of scheduler node $54_7$, which is a root node of scheduler 600. Scheduler node $54_7$ includes an output that provides a selected one of the queues. Scheduler node $54_7$ can also have input(s) selected directly from queue output(s), as shown in the example. Note that scheduler 600 is formed by linking the data structures of scheduler nodes 54 in memory 52 (e.g., next node connectivity 520).

Figure 7:
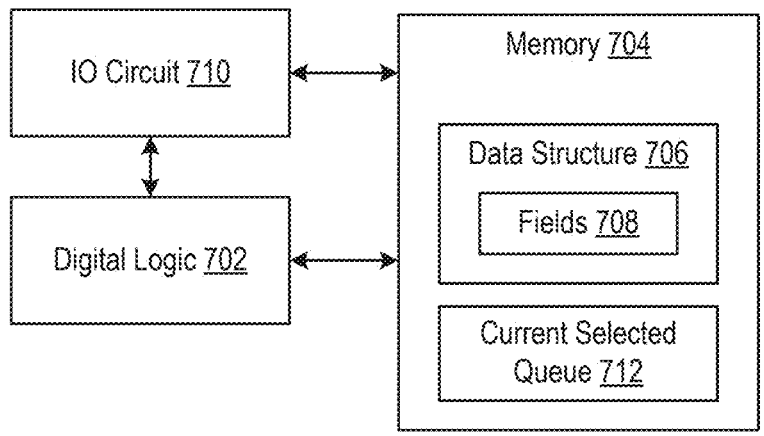
FIG. 7 is a block diagram depicting an accelerator according to some embodiments.

FIG. 7 is a block diagram depicting accelerator 50 according to some embodiments. Accelerator 50 comprises digital logic 702, memory 704, and IO circuit 710. IO circuit 710 provides an input/output interface of accelerator 50, e.g., for communicating with memory 52, PD FIFOs $56_1 \ldots 56_N$, command FIFO 48, and IO circuit 46. Memory 704 stores a data structure 706 having fields 708. Data structure 706 may be a memory structure of one or more memories for storing data. Data structure 706 can store one instance of scheduler node 54. Fields 708 store the data of scheduler node 54 (e.g., example data shown in FIG. 5). A field may be a portion of data structure 706. Memory 704 can be RAM. Data structure 706 can be stored, for example, in registers where each field 808 is stored by a register. Digital logic 702 can receive commands from command FIFO 48 through IO circuit 710. In response to a command, digital logic 702 performs a traverse operation by loading memory 704 with scheduler node 54, where the data of scheduler node 54 is stored in fields 708 of data structure 706. A traverse operation may be an operation that processes one or more scheduler nodes in succession. An iteration of a traverse operation may process one scheduler node. Digital logic 702 can then read data from fields 708 and update data in fields 708 according to scheduling and traffic shaping algorithms. Digital logic 702 can then update the data of scheduler node 54 in memory 52 via IO circuit 710 with updated data from fields 708. Digital logic 702 can then load memory 704 with the next scheduler node 54. The traverse operation successively loads scheduler nodes 54 to memory from a leaf-node towards root node of the scheduler. As a result of the traverse operation, digital logic 702 can store current selected queue 712 in memory 704. Digital logic 702 can also read PDs from PD FIFOs $56_1 \ldots 56_N$. Digital logic 702 can output PDs to controller 26 through IO circuit 710 and IO circuit 46. Digital logic 702 can include asynchronous and synchronous digital circuits configured to perform the functions of accelerator 50 described herein.

Figure 8:
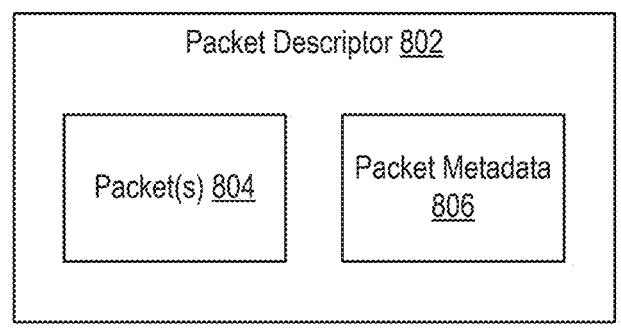
FIG. 8 is a block diagram depicting a packet descriptor according to some embodiments.

FIG. 8 is a block diagram depicting a packet descriptor (PD) 802 according to some embodiments. Packet descriptor (PD) 802 comprises one or more packet(s) 804 and packet metadata 806. Packet metadata 806 can include attributes of packet(s) 804, such as packet length, source/destination addresses, priority information, quality of service (QOS) information, timestamps, error checking information, and the like.

Figure 9:
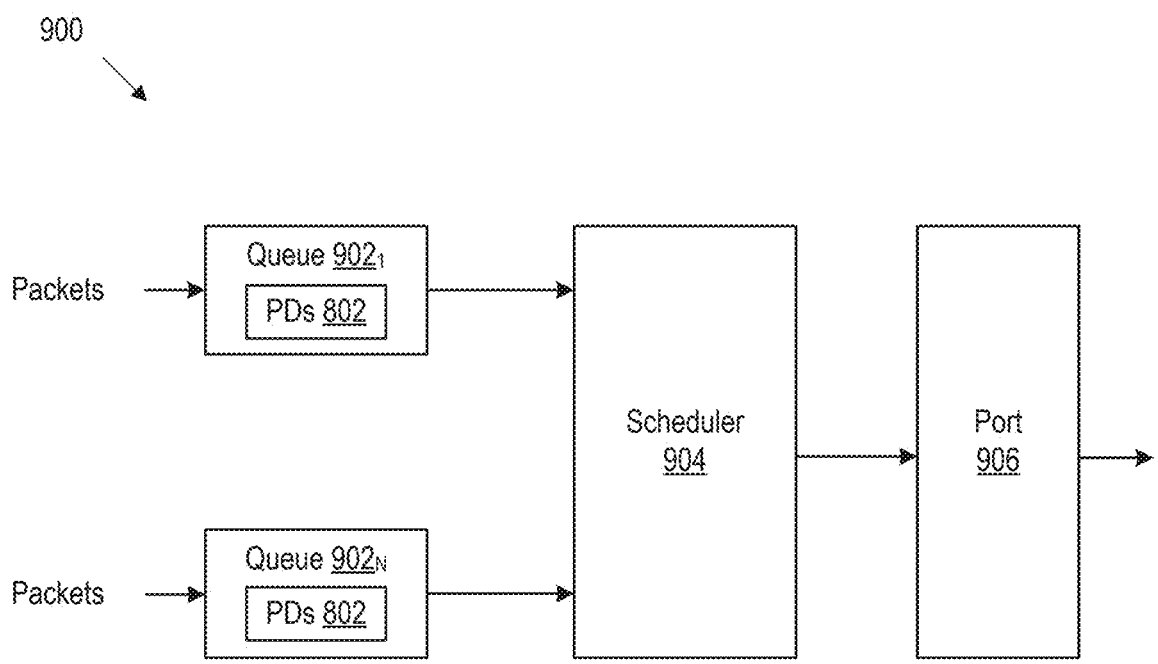
FIG. 9 is a block diagram depicting a logical view of a traffic management system for a network device according to embodiments.

FIG. 9 is a block diagram depicting a logical view of a traffic management system 900 for a network device according to embodiments. Traffic management system 900 includes queues $902_1 \ldots 902_N$, scheduler 904, and port 906. Queues $902_1 \ldots 902_N$ store PDs 802 generated from input packets (e.g., by queue manager 22). Queues $902_1 \ldots 902_N$ are implemented by FIFOs $30_1 \ldots 30_N$ and PD FIFOs $56_1 \ldots 56_N$, where FIFOs $30_1 \ldots 30_N$ store the tail PDs and PD FIFOs $56_1 \ldots 56_N$ store the head PDs. Scheduler 904 schedules PDs for transmission by port 906 by selecting among queues $902_1 \ldots 902_N$. Scheduler 904 can be implemented in hardware by GSU 28 under control of controller 26 as described above.

Figure 10:
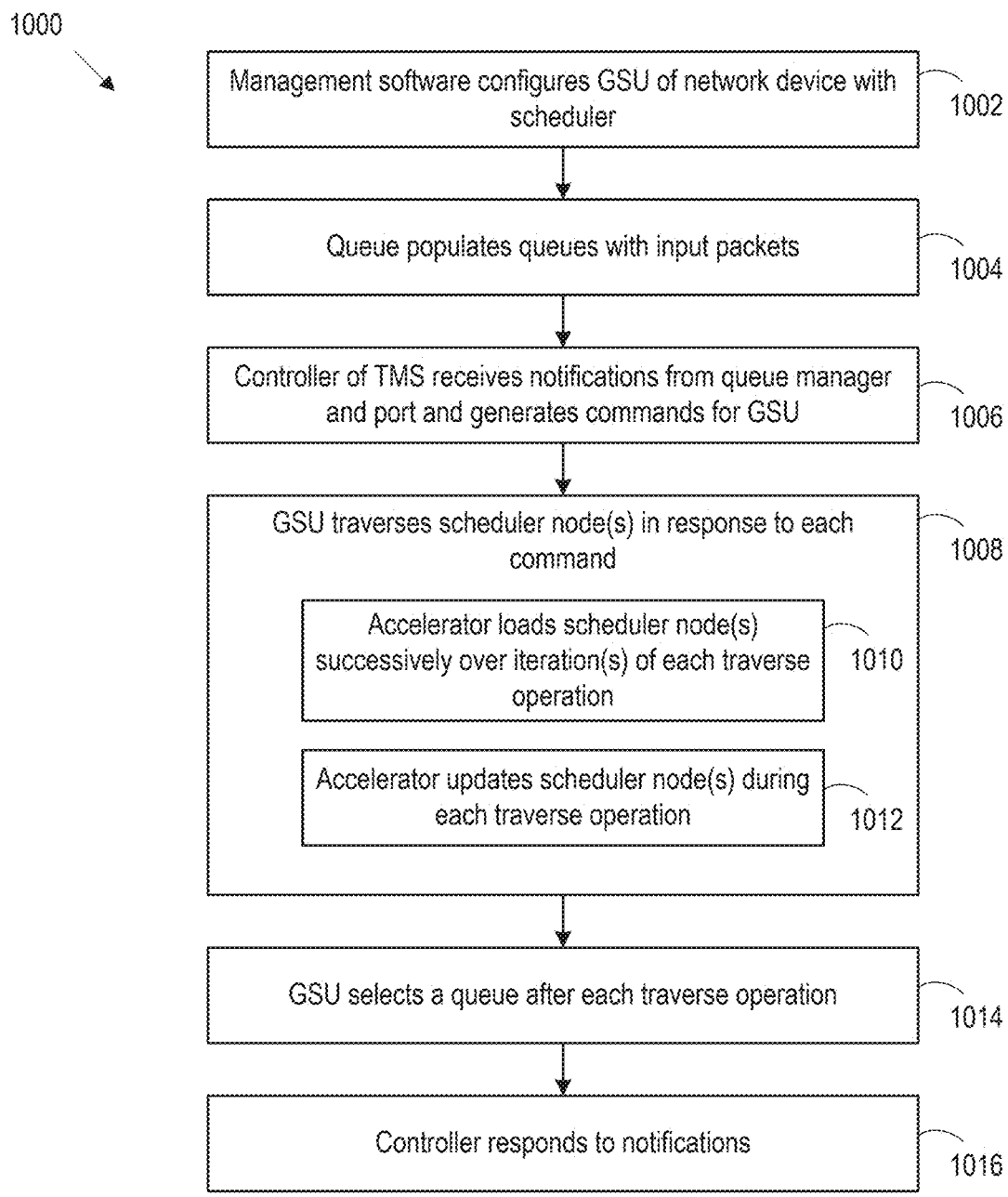
FIG. 10 is a flow diagram depicting a method of traffic management in a network device according to embodiments.

FIG. 10 is a flow diagram depicting a method 1000 of traffic management in a network device according to embodiments. Method 1000 begins at step 1002, where management software 23 interacts with device manager 24 of the network device to configure GSU 28 with scheduler data. Management software 23 can interact with device manager 24 to store scheduler nodes 54 in memory 52 of GSU 28. Management software 23 can initialize data of each scheduling node 54 (e.g., initialize input data 502, output data 514, scheduling data 522, and traffic shaping data 528).

At step 1004, queue manager 22 populates queues with input packets. In some embodiments, queue manager 22 generates PDs from input packets and queues the PDs. PDs are assigned to different queues based on attribute(s) of the PDs. Queue manager 22 can store PDs in FIFOs 30 and PD FIFOs 56. Each FIFO 30 can store the tail of a respective queue and each PD FIFO 56 can store the head of a respective queue.

At step 1006, controller 26 receives notifications from queue manager 22 and port 15 and generates commands for GSU 28. A notification from queue manager 22 can indicate that a PD has been added to a PD FIFO 56 (e.g., a PD has been added to the head of a queue). A notification from port 15 can indicate a number of PDs requested for transmission. Controller 26 can generate commands in response to the notifications. An update queue task 38 can generate commands for GSU 28 in response to notifications from queue manager 22. A transmit task 40 can generate commands for GSU 28 in response to notifications from port 15. Controller 26 can generate some commands autonomously. For example, timer task 42 can generate commands to update the scheduler data periodically.

At step 1008, GSU 28 traverses scheduler node(s) 54 in response to each command. As shown in the example of FIG. 6, scheduler 600 can include a hierarchy of scheduler nodes 54. GSU 28 can perform a traverse operation in response to a command. A traverse operation may include GSU 28 processing one or more scheduler nodes 54 successively over one or more iterations. Thus, at step 1010, accelerator 50 loads scheduler node(s) successively over iteration(s) of each traverse operation. In an iteration of traverse operation, accelerator 50 loads fields 708 of data structure 706 in memory 704 with data from a scheduler node 54. A traverse operation can include a single iteration or multiple iterations. In the case of multiple iterations, accelerator 50 loads fields 708 of data structure 706 with data of a different scheduler node for each iteration. At step 1012, accelerator 50 can update one or more scheduler nodes 54 during the traverse operation with updated data. Accelerator 50 can store updated data to one or more scheduler nodes 54 in memory 52. Updated data can include new values, such as new values of state data 526 of scheduling data 522, new values of state data 532 of traffic shaping data 528, or a new value of selected input 518.

At step 1014, GSU 28 selects a queue after each traverse operation. Accelerator 50 can store current selected queue 712 in memory 704. Current selected queue 712 can store the selected queue output by the root node of the scheduler (e.g., scheduler node $54_7$ of scheduler 600). After each traverse operation, the value of current selected queue 712 can change or stay the same depending on whether the traverse operation resulted in changing the selected queue of the root node in the scheduler. In general, GSU 28 selects a queue after each traverse operation whether that queue has changed from a previous traverse operation or remains the same as a previous traverse operation.

At step 1016, controller responds to the notifications received at step 1006. For example, in response to a notification from port 15, controller 26 can command GSU 28 to supply PD(s) from selected queue(s). GSU 28 can store the PD(s) as transmit PD(s) 44 in memory 34. Controller 26 can then send transmit PD(s) 44 to port 15. Port 15 can then transmit the packet(s) from transmit PD(s) 44. In response to a notification from queue manager 22, controller can respond with an acknowledgement. Queue manager 22 can wait for acknowledgment(s) before sending additional notification(s).

Figure 11:
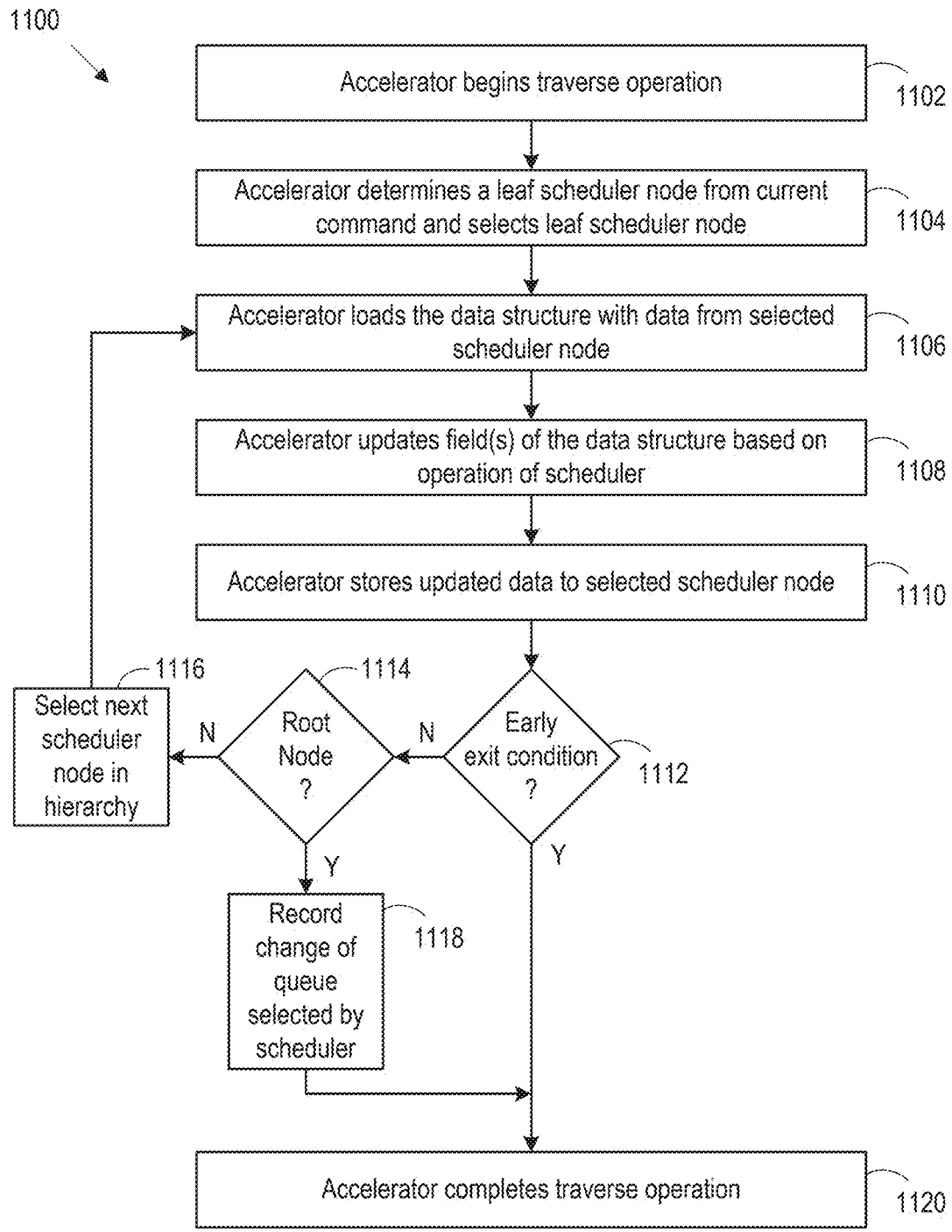
FIG. 11 is a flow diagram depicting a method of traversing a scheduler hierarchy according to some embodiments.

FIG. 11 is a flow diagram depicting a method 1100 of traversing a scheduler hierarchy according to some embodiments. Method 1100 begins at step 1102, where accelerator 50 begins the traverse operation. For example, accelerator 50 can begin a traverse operation in response to a command received from controller 26 (e.g., step 1008 of method 1000 shown in FIG. 10). At step 1104, accelerator 50 determines a leaf scheduler node from the current command and selects the leaf scheduler node to process. Leaf scheduler nodes have inputs from queues, as shown in the example of FIG. 6.

At step 1106, accelerator 50 loads data structure 706 with data from the selected scheduler node. Accelerator 50 can load fields 708 with corresponding data from scheduler node 54 (e.g., fields for input data 502, fields for output data 514, fields for scheduling data 522, and fields for traffic shaping data 528). At step 1108, accelerator 50 updates field(s) 808 of data structure 706 based on operation of the scheduler. As described above, the scheduler can implement a scheduling algorithm, such as a combination of strict scheduling and DWRR scheduling. Digital logic 702 of accelerator 50 performs the scheduling algorithm and updates field(s) 808 (e.g., updates fields associated with state data 526 of scheduling data 522, state data 532 of traffic shaping data 528, selected input 518, etc.). At step 1110, accelerator 50 stores updated data to the selected scheduler node (e.g., updates to scheduling data 522, traffic shaping data 528, selected input 518, etc.).

At step 1112, accelerator 50 determines if an early exit condition exists for exiting the traverse operation. For example, with some types of commands, an early exit condition can be an output of the selected scheduling node being unchanged. That is, accelerator 50 can check whether selected input 518 has changed as a result of the operation of the scheduler. If there is an early exit condition, method 1100 proceeds to step 1114. For other types of commands (e.g., the transmit (TX) command discussed below), there may be no early exit condition and the scheduler may be traversed from leaf to root for each TX command. At step 1114, accelerator 50 determines if the selected node is the root node of the scheduler. If not, method 1100 proceeds to step 1116, where accelerator 50 selects the next scheduler node in the scheduler hierarchy. Accelerator 50 can determine the next scheduler node based on next node connectivity 520 of the selected scheduler node. Method 1100 then returns to step 1106 and repeats. If at step 1114 the selected node is the root node, method 1100 proceeds to step 1118. At step 1118, accelerator 50 records the change of queue selected by the scheduler (if any). That is, the output of the root node is the output of the scheduler, which may or may not have changed in response to the traverse operation. Accelerator 50 updates current selected queue 712 in response to a change in the output of the root node. Method 1100 proceeds from step 1118 to step 1120. If at step 1112 the output of the selected scheduler node has not changed, method 1100 proceeds to step 1120. At step 1120, accelerator 50 completes the traverse operation.

Figure 12:
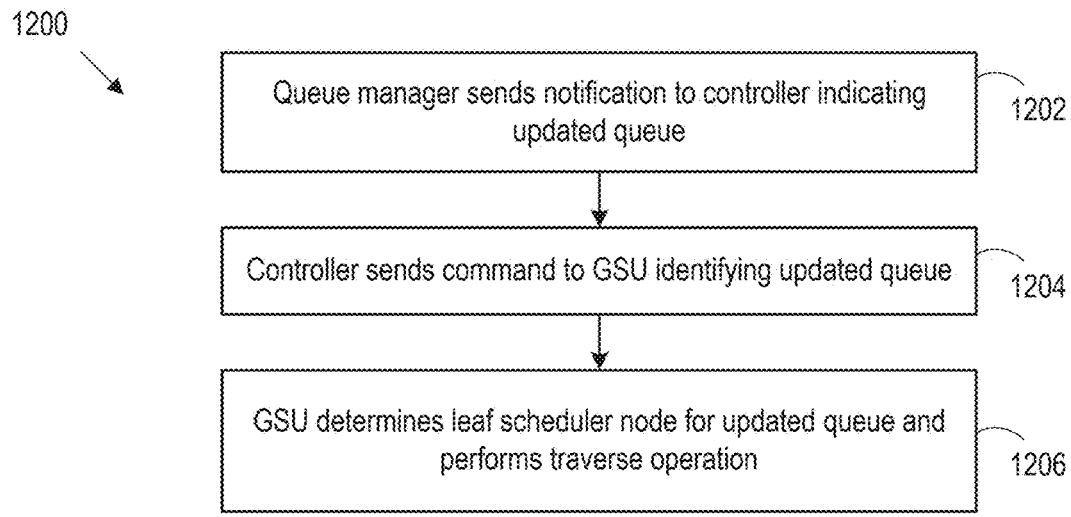
FIG. 12 is a flow diagram depicting a method of traffic management in response to updating a queue according to some embodiments.

FIG. 12 is a flow diagram depicting a method 1200 of traffic management in response to updating a queue according to some embodiments. Method 1200 begins at step 1202, where queue manager 22 sends a notification to controller 26 indicating an updated queue. Queue manager 22 can update a queue by inserting a new PD in a PD FIFO 56. At step 1204, controller 26 sends a command to GSU 28 identifying the updated queue (e.g., by queue number). At step 1206, GSU 28 determines a leaf scheduler node that has the updated queue as input and performs the traverse operation. The traverse operation may result in a change of the currently selected queue for transmission, as described above. The traverse operation for queue update can include an early exit condition for exiting the traverse operation if the output of the selected scheduling node is unchanged. In other embodiments, there is no early exit condition.

Figure 13:
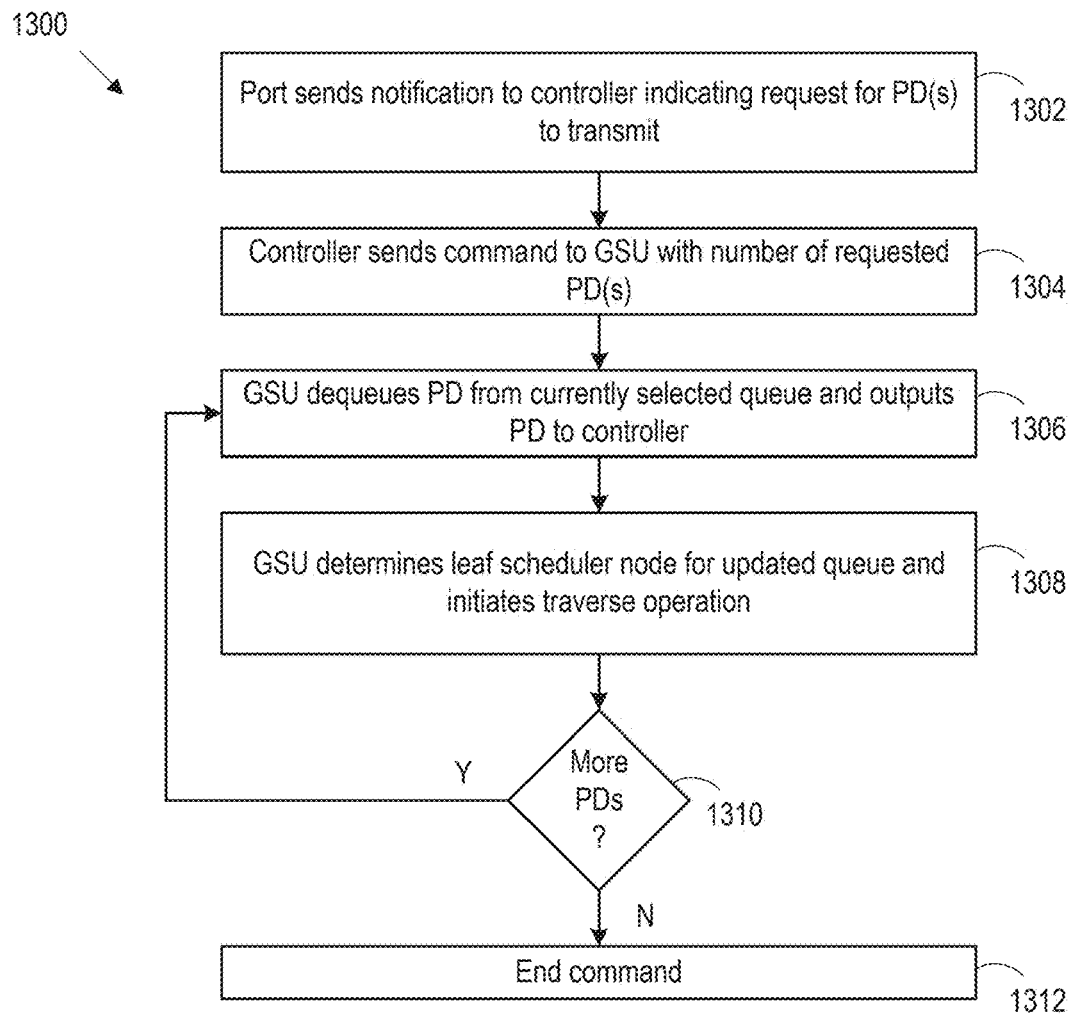
FIG. 13 is a flow diagram depicting a method of transmitting packets according to some embodiments.

FIG. 13 is a flow diagram depicting a method 1300 of transmitting packets according to some embodiments. Method 1300 begins at step 1302, where port 15 sends a notification to controller 26 indicating a request for PD(s) to transmit. At step 1304, controller 26 sends a command to GSU 28 with the number of requested PDs. At step 1306, GSU 28 dequeues a PD from the current selected queue and outputs the PD to controller 26. At step 1308, GSU 28 determines a leaf scheduler node that has the updated queue as input and performs the traverse operation. The traverse operation may result in a change of the currently selected queue for transmission, as described above. The traverse operation for TX command can have no early exit condition. GSU 28 can traverse the scheduler from leaf to root even if there is no change in the output of a node (e.g., in order to update shaper and DWRR counters across relevant nodes). At step 1310, GSU 28 determines if there are more PDs to be transmitted. If so, method 1300 returns to step 1306. Otherwise, method 1300 proceeds to step 1312, where GSU 28 ends the command.

Methods 1200 and 1300 can be understood with respect to the following example. Assume scheduler 600 shown in FIG. 6. Start with no active PDs in the system. Then, controller 26 receives an update notification from queue manager 22 that indicates a queue $902_1$ connected to scheduler node $54_1$ has a new PD (e.g., queue manager 22 inserted a new PD in PD FIFO $56_1$). In such case, GSU 28 performs a traverse operation. In a first iteration, accelerator 50 loads scheduler node $54_1$ and updates its data according to the scheduling algorithm. The result is that the selected input of scheduler node $54_1$ is queue $902_1$ (e.g., changed from none to queue $902_1$). In a second iteration, accelerator 50 loads scheduler node $54_5$ and updates its data according to the scheduling algorithm. The result is that the selected input of scheduler node $54_5$ is queue $902_1$ (e.g., changed from none to queue $902_1$). In a third iteration, accelerator 50 loads scheduler node $54_7$ and updates its data according to the scheduling algorithm. The result is that the selected input of scheduler node $54_7$ is queue $902_1$ (changed from none to queue $902_1$). Since scheduler node $54_7$ is the root node, accelerator 50 completes the traverse operation.

Thereafter, controller 26 receives an update notification from queue manager 22 that indicates queue $902_1$ has another new PD. GSU 28 performs a traverse operation. In a first iteration, accelerator 50 loads scheduler node $54_1$ and performs the scheduling algorithm. The result is that the selected input of scheduler node $54_1$ stays the same, i.e., queue $902_1$. As such, accelerator 50 completes the traverse operation.

Thereafter, controller 26 receives an update notification from queue manager 22 that indicates queue $902_2$ has a new PD (e.g., queue manager 22 inserted a new PD in PD FIFO $56_2$). Assume queue $902_2$ is connected to scheduler node $54_2$. In such case, GSU 28 performs a traverse operation. In a first iteration, accelerator 50 loads scheduler node $54_2$ and updates its data according to the scheduling algorithm. The result is that the selected input of scheduler node $54_2$ is queue $902_2$ (e.g., changed from none to queue $902_2$). In a second iteration, accelerator 50 loads scheduler node $54_5$ and updates its data according to the scheduling algorithm. Assume the input from scheduler node $54_2$ has a higher priority than scheduler node $54_1$. The result is that the selected input of scheduler node $54_5$ is queue $902_2$ (e.g., changed from queue $902_1$ to queue $902_2$). In a third iteration, accelerator 50 loads scheduler node $54_7$ and updates its data according to the scheduling algorithm. The result is that the selected input of scheduler node $54_7$ is queue $902_2$ (changed from queue $902_1$ to queue $902_2$). Since scheduler node $54_7$ is the root node, accelerator 50 completes the traverse operation.

Thereafter, controller 26 receives a transmit notification from port 15 requesting two PDs. Controller 26 sends a command to GSU 28 requesting two PDs. GSU 28 uses current selected queue 712, which is set to queue $902_2$, to send a PD to controller 26. Since queue $902_2$ is connected to scheduler node $54_2$, GSU 28 performs a traverse operation starting from scheduler node $54_2$. In a first iteration, accelerator 50 loads scheduler node $54_2$ and updates its data according to the scheduling algorithm. The result is that there are no more PDs in queue $902_2$ and the selected input of scheduler node $54_2$ changes to none. In a second iteration, accelerator 50 loads scheduler node $54_5$ and updates its data according to the scheduling algorithm. As its only active input is from queue $902_1$, the selected input of scheduler node $54_5$ changes to queue $902_1$. In a third iteration, accelerator 50 loads scheduler node $54_7$ and updates its data according to the scheduling algorithm. The selected input of the root changes to queue $902_1$. Since scheduler node $54_7$ is the root node, accelerator 50 completes the traverse operation.

GSU 28 determines that another PD has been requested by the command and uses current selected queue, which is now set to queue $902_1$, to send a PD to controller 26. Since queue $902_1$ is connected to scheduler node $54_1$, GSU 28 performs a traverse operation starting from scheduler node $54_1$. In a first iteration, accelerator 50 loads scheduler node $54_1$ and updates its data according to the scheduling algorithm. The result is that the selected input of scheduler node $54_1$ stays at queue $902_1$. Since there is no change in the output of scheduler node $54_1$, accelerator 50 completes the traverse operation. Since GSU 28 has output two PDs as requested by the command, GSU 28 signals end command to controller 26.

Figure 14:
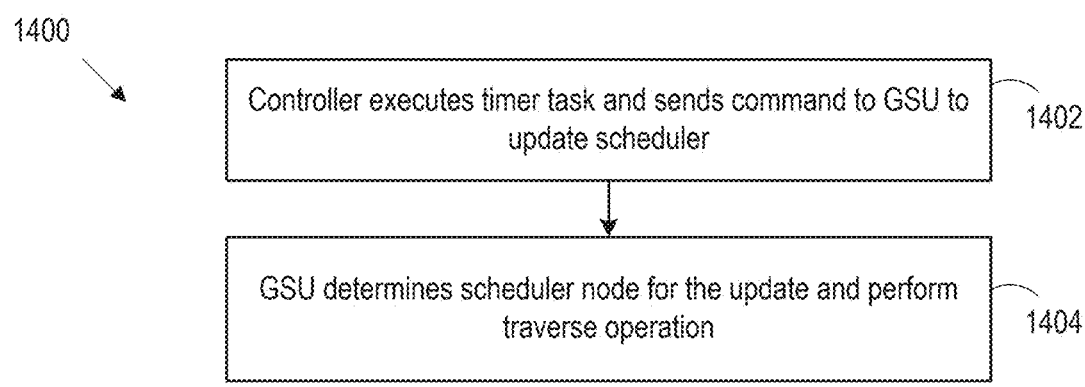
FIG. 14 is a flow diagram depicting a method of updating a scheduler according to some embodiments.

FIG. 14 is a flow diagram depicting a method of updating a scheduler according to some embodiments. Method 1400 begins at step 1402, where controller 26 executes a timer task and sends a command to GSU 28 to update the scheduler data. At step 1404, GSU 28 determines scheduler node(s) for the update and performs traverse operation(s) as described above. In this manner, controller 26 can periodically update the scheduler data.

While some processes and methods having various operations have been described, one or more embodiments also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items. By way of example, the phrases "at least one of A, B, and C" or "at least one of A, B, or C" each refer to only A, only B, or only C; and/or any combination of A, B, and C. In instances where it is intended that a selection be of "at least one of each of A, B, and C," or alternatively, "at least one of A, at least one of B, and at least one of C," it is expressly described as such.

As used herein, the term "couple" and its derivatives include: (a) electrical and communicative coupling; and (b) do not imply a direct connection, but rather may include intervening elements, unless described as "directly coupled."

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A traffic management system for a network device, comprising:
a first memory storing queues of packets received by the network device;
a second memory storing data of a scheduler for the queues that schedules transmission of the packets to a port of the network device; and
an accelerator circuit including a third memory to store a data structure, the accelerator circuit coupled to the second memory and operable to:
load, for a first iteration of a traverse operation in response to a command, a field of the data structure in the third memory with data from a first node of the scheduler;
update, during the first iteration of the traverse operation, the field of the data structure in the third memory; and
store, during the first iteration of the traverse operation, updated data from the field to the first node in the second memory.

2. The traffic management system of claim 1, wherein the accelerator circuit is operable to:
load, for a second iteration of the traverse operation, the field of the data structure in the third memory with data from a second node of the scheduler referred to by the first node;
update, during the second iteration of the traverse operation, the field of the data structure in the third memory; and
store, during the second iteration of the traverse operation, updated data from the field to the second node in the second memory.

3. The traffic management system of claim 2, wherein the accelerator circuit is operable to:
determine that the second node of the scheduler is a root node; and
determine a selected one of the queues by the root node.

4. The traffic management system of claim 1, further comprising:
a controller comprising a central processing unit (CPU) executing software stored in a fourth memory, the controller operable to send the command to the accelerator circuit.

5. The traffic management system of claim 4, wherein the accelerator circuit is operable to select a first queue of the queues in response to the traverse operation and output a packet from the first queue to the controller, and wherein the controller is operable to output the packet to the port.

6. The traffic management system of claim 5, wherein the controller is operable to receive a notification from the port and send the command to the accelerator circuit in response to the notification.

7. The traffic management system of claim 4, wherein the CPU executes a timer task of the software, and wherein the CPU sends the command to the accelerator circuit in response to the timer task.

8. The traffic management system of claim 4, wherein the network device includes a queue manager coupled to the controller and the accelerator circuit, wherein the queues in the first memory receive the packets from the queue manager, and wherein the controller is operable to send the command to the accelerator circuit in response to a notification from the queue manager.

9. A network device, comprising:
a queue manager operable to maintain queues of packets;
a port;
a controller coupled to the queue manager and the port;
a first memory storing nodes of a scheduler for the queues that schedules transmission of the packets to the port; and
an accelerator circuit including a second memory, the accelerator circuit coupled to the controller and the first memory and operable to:
load, for a traverse operation in response to a command from the controller, the second memory with data from each of multiple nodes of the nodes successively over multiple iterations;
update, during the traverse operation for at least one of the multiple iterations, the second memory; and
store, during the traverse operation, updated data from the second memory to at least one of the multiple nodes in the first memory.

10. The network device of claim 9, wherein the controller comprises a central processing unit (CPU) executing software stored in a third memory.

11. The network device of claim 9, wherein the port is operable to send a notification to the controller for a packet to transmit, wherein the controller is operable to send the command to the accelerator circuit in response to the notification, wherein the accelerator circuit is operable to identify a first queue of the queues as selected by the scheduler, wherein the accelerator circuit is operable to dequeue a packet from the first queue and output the packet to the controller, and wherein the controller is operable to output the packet to the port.

12. The network device of claim 11, wherein the accelerator circuit is operable to perform the traverse operation in response to dequeuing the packet from the first queue.

13. The network device of claim 12, wherein the accelerator circuit is operable to identify a second queue of the queues as selected by the scheduler after the traverse operation.

14. The network device of claim 11, further comprising:
first-in-first-out memories (FIFOs) having inputs coupled to the queue manager and outputs coupled to the accelerator circuit;
wherein the accelerator circuit dequeues the packet from the first queue by reading from a first FIFO of the FIFOs.

15. A method of traffic management in a network device, comprising:
storing, in queues, packets received by the network device;
storing, in a first memory, nodes of a scheduler to select for the queues that schedules transmission of the packets to a port of the network device; and
updating, by an accelerator circuit in response to a command from a controller, the scheduler by loading, for a traverse operation, fields of a data structure with data from each of multiple nodes of the nodes successively over multiple iterations, updating, during the traverse operation for at least one of the multiple iterations, the fields of the data structure, and storing, during the traverse operation, updated data to at least one of the multiple nodes in the first memory.

16. The method of claim 15, further comprising:
receiving, at the controller, a notification from the port for a packet to transmit;
sending, by the controller to the accelerator circuit, the command in response to the notification;

identifying, by the accelerator circuit, a first queue of the queues as selected by the scheduler;

dequeuing, by the accelerator circuit, the packet from the first queue;

outputting, by the accelerator circuit to the controller, the packet; and outputting, by the controller, the packet to the port.

17. The method of claim 16, wherein the accelerator circuit performs the step of updating in response to dequeuing the packet from the first queue.

18. The method of claim 17, further comprising:

identifying, by the accelerator circuit, a second queue of the queues as selected by the scheduler after the traverse operation.

19. The method of claim 15, further comprising:

executing, by the controller, a timer task; and sending, by the controller to the accelerator circuit, the command in response to the timer task.

20. The method of claim 15, further comprising:

receiving, at the controller, a notification from a queue manager that manages the queues; and sending, by the controller to the accelerator circuit, the command in response to the notification.

* * * * *